Aug. 30, 1927.  1,641,059
E. TAUSCH
RESILIENT RING ELEMENT
Filed May 18, 1926   2 Sheets-Sheet 1
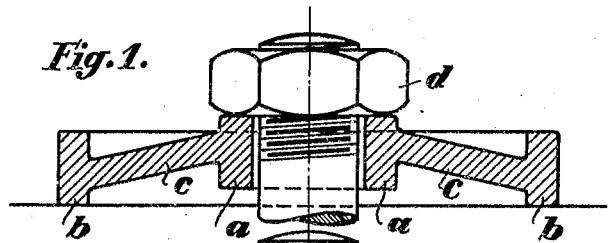
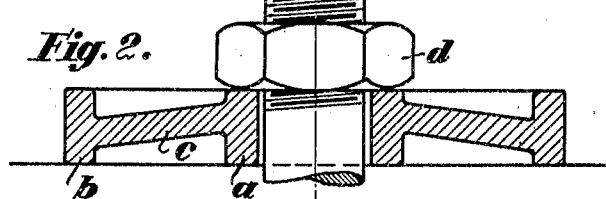
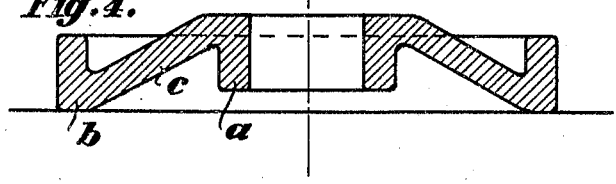
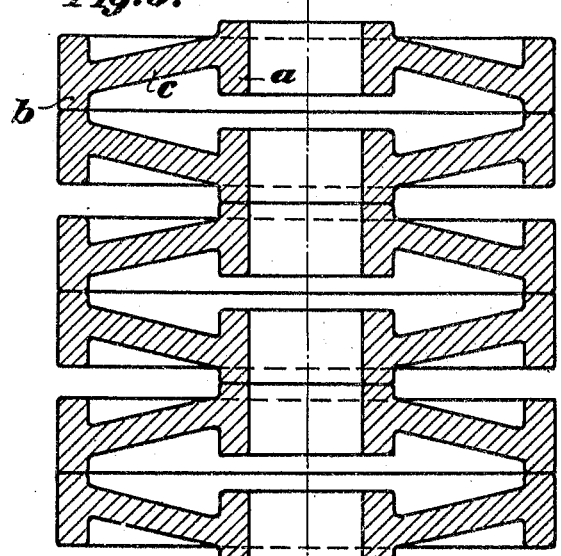

Aug. 30, 1927. 1,641,059
E. TAUSCH
RESILIENT RING ELEMENT
Filed May 18, 1926 2 Sheets-Sheet 2
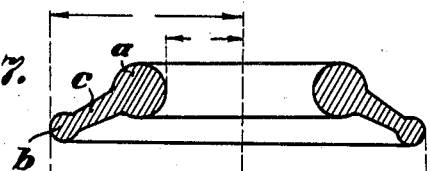
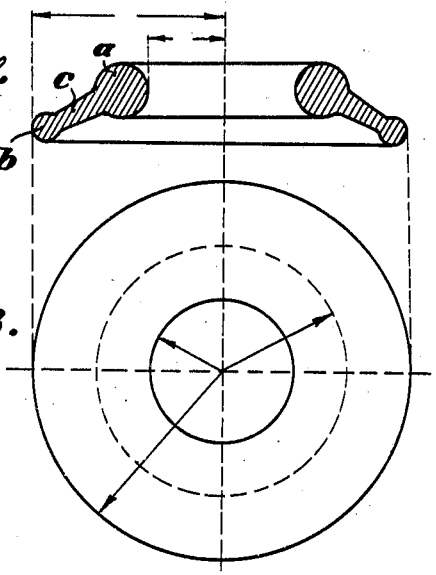
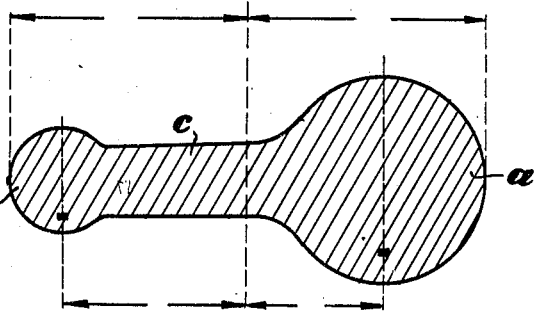
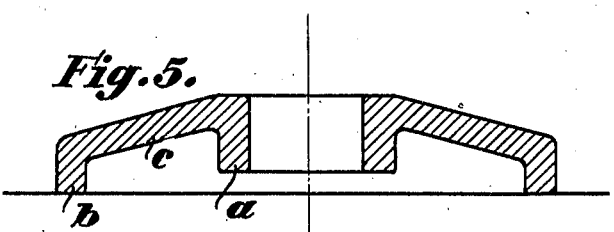
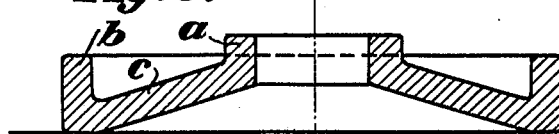
Ernst Tausch
Inventor Patented Aug. 30, 1927.

1,641,059

UNITED STATES PATENT OFFICE.

ERNST TAUSCH, OF WILMERSDORF, NEAR BERLIN, GERMANY.

RESILIENT-RING ELEMENT.

Application filed May 18, 1926, Serial No. 110,008, and in Germany May 19, 1925.

My invention relates to a resilient ring element. The known resilient ring elements based on the principle of the compression and tension ring require generally accurate and therefore expensive machining and their efficiency becomes soon impaired in the open air by rusting and clogging.

The object of my invention is to avoid these drawbacks. The novel feature of my improved resilient ring element is that the compression ring is connected with the tension ring by a web in such a manner that in case of axial pressure this web subjects the inner ring substantially to pressure and the outer ring substantially to tension. Such a resilient ring element may be produced without any substantial machining as a single piece, for instance by stamping, and has the advantage that owing to the frictionless operation of the spring the danger of a reduction of the efficiency by rusting or soiling does not exist.

In the accompanying drawings two applications of my improved element and a plurality of constructions are illustrated by way of example.

In the drawings show:

Figs. 1 and 2 cross-sections through a resilient ring element as employed for locking a nut in position, in the uncompressed and the compressed state, Fig. 3, a number of the same resilient ring elements combined into an elastic pile or spring, Figs. 4 to 7, four further designs of resilient ring elements similar to Fig. 1 in the unstrained state in vertical section, and Figs. 8 and 9, a plan and an enlarged cross-section of the embodiment of any invention according to Fig. 7.

Identical parts are indicated by like letters of reference in all the figures of the drawings.

Referring to Fig. 1, the resilient ring consists of two closed rings $a$ and $b$ joined by an annular disc-shaped, preferably solid web $c$ in such a manner that in case of an axial pressure upon the rings $a$ and $b$, i. e. in the event of the element being employed as resilient washer for a lock nut according to Figs. 1 and 2 when the nut $d$ is tightened, the inner ring $a$ is subjected to pressure and the outer ring $b$ to tension without any friction being developed. It is essential that the web even in the strained state (Fig. 2) forms an angle with the axis of the disc as otherwise no axial reaction power would be developed.

The web $c$ is preferably made integral with the inner as well as the outer ring, as shown. It is, however, possible to construct the two rings and the web as separate pieces and to combine them in suitable manner.

Fig. 3 of the drawings illustrates how a number of such annular or disc-shaped resilient elements of the design shown in Fig. 1 may be combined into a frictionless resilient pile or spring, and the construction and function of such a spring pillar will be readily understood in view of the foregoing explanations.

The stamped or pressed resilient ring elements according to Figs. 4 to 6 operate in a similar manner and do by no means exhaust the construction possibilities.

Fig. 7 for instance shows a further embodiment which aims at a complete utilization of the material employed in the construction. In this embodiment also the resilient element consists of a compression ring $a$ and a tension ring $b$ united by a web $c$ in such a manner that in the event of an axial thrust upon the element the inner ring $a$ is subjected substantially to pressure only and the outer ring $b$ substantially to tension only.

In order to utilize the material to the best advantage, this embodiment differs from the previously described ones by the inner ring $a$ being made so much stronger in cross-section as compared with the outer ring $b$ that the tension in the most extreme outer ring fibre is equal or approximately equal to the pressure on the most extreme inner ring fibre.

I wish it to be understood that I do not limit myself to the designs illustrated by way of examples and that modifications in the details may be made without departing from the spirit of my invention or the ambit of my claims.

I claim as my invention:

1. In a resilient ring element, an inner ring, an outer ring and a web connecting both said rings in such a manner that by an axial pressure upon the element the said inner ring is subjected to pressure and the said outer ring to tension.

2. In a resilient ring element, an inner ring, an outer ring and a web integral with both said rings and so located in relation to the axis of said element that axial thrust upon said element subjects said inner ring to pressure and said outer ring to tension.

3. In a resilient ring element, an inner ring, an outer ring and a web connecting both said rings in such a manner that by an axial pressure upon the element the said inner ring is subjected to pressure and the said outer ring to tension, the cross-section of the inner ring being so much larger than the cross-section of the outer ring that the compression strain in the innermost ring fibre is substantially equal to the tension strain in the outermost ring fibre.

4. In a resilient ring element, an inner ring, an outer ring and a web integral with both said rings and so located in relation to the axis of said element that axial thrust upon said element subjects said inner ring to pressure and said outer ring to tension, the cross-section of the inner ring being so much larger than the cross-section of the outer ring that the compression strain in the innermost ring fibre is substantially equal to the tension strain in the outermost ring fibre.

5. In a lock nut with resilient washer, a resilient ring element consisting of an inner ring, an outer ring and a web connecting both said rings in such a manner that by an axial pressure upon the element the said inner ring is subjected to pressure and the said outer ring to tension.

6. In a lock nut with resilient washer, a resilient ring element consisting of an inner ring, an outer ring and a web integral with both said rings and so located in relation to the axis of said element that axial thrust upon said element subjects said inner ring to pressure and said outer ring to tension.

7. A resilient ring element, comprising two rings of different diameter situated in different planes, the outer periphery of the ring of lesser periphery being joined to the inner periphery of the ring of greater diameter by a web inclined to the planes of said rings.

In testimony whereof, I have signed my name to this specification.

ERNST TAUSCH.